United States Patent
Hafeman (10) Patent No.: US 9,730,040 B2
(45) Date of Patent: Aug. 8, 2017

(54) COMMUNICATION APPARATUS, SYSTEM AND METHOD

(71) Applicant: Carolyn W. Hafeman, Evergreen, CO (US)

(72) Inventor: Carolyn W. Hafeman, Evergreen, CO (US)

(*) Notice: Subject to any disclaimer, the term of this patent is extended or adjusted under 35 U.S.C. 154(b) by 0 days.

(21) Appl. No.: 14/809,908

(22) Filed: Jul. 27, 2015

(65) Prior Publication Data

US 2016/0037319 A1   Feb. 4, 2016

Related U.S. Application Data

(60) Provisional application No. 62/032,927, filed on Aug. 4, 2014.

(51) Int. Cl.
| | |
|---|---|
| *H04M 11/04* | (2006.01) |
| *H04W 4/22* | (2009.01) |
| *H04W 4/02* | (2009.01) |

(52) U.S. Cl.
CPC ............... *H04W 4/22* (2013.01); *H04W 4/02* (2013.01)

(58) Field of Classification Search
CPC .................................. H04W 4/22; H04W 4/02
USPC ...................................................... 455/404.2
See application file for complete search history.

(56) References Cited

U.S. PATENT DOCUMENTS

| | | | | |
|---|---|---|---|---|
| 4,743,894 A | * | 5/1988 | Bochmann | G07C 9/00142 340/426.28 |
| 5,719,780 A | * | 2/1998 | Holmes | A61J 7/0481 700/231 |
| 5,900,823 A | * | 5/1999 | Coll-Cuchi | B60R 25/04 307/10.3 |
| 5,946,636 A | * | 8/1999 | Uyeno | H04M 1/576 455/566 |
| 6,005,476 A | * | 12/1999 | Valiulis | G08B 13/1418 340/12.32 |
| 8,402,533 B2 | * | 3/2013 | LeBeau | G06F 3/048 726/17 |
| 9,225,753 B1 | * | 12/2015 | Maxwell | |
| 2002/0090913 A1 | * | 7/2002 | Ritter | H04B 1/086 455/41.2 |
| 2004/0222889 A1 | * | 11/2004 | Hoshina | G08B 13/1427 340/572.8 |
| 2007/0135043 A1 | * | 6/2007 | Hayes | H04M 1/67 455/26.1 |

(Continued)

*Primary Examiner* — Charles Shedrick
(74) *Attorney, Agent, or Firm* — Ansel M. Schwartz (57) ABSTRACT

A communication apparatus includes a computer. The apparatus includes a transmitter for transmitting wireless signals in communication with the computer. The apparatus includes a memory in communication with the computer. The apparatus includes a display in communication with the computer. The apparatus includes a first operational screen that appears on the display after the apparatus is turned on or woken up. The first operational screen is a first screen through which the computer can be activated and performed by the computer. The first operational screen having an emergency icon which when selected causes the computer to send with the transmitter a text stored in the memory to at least one remote contact stored in the memory along with location information from a GPS or tracking location system where the apparatus is currently located. A method for communicating.

12 Claims, 7 Drawing Sheets

(56) References Cited

U.S. PATENT DOCUMENTS

| | | | |
|---|---|---|---|
| 2009/0205041 A1* | 8/2009 | Michalske | G06F 21/31 726/17 |
| 2011/0066501 A1* | 3/2011 | Saxena | G06Q 30/02 705/14.64 |
| 2013/0149989 A1* | 6/2013 | Kwon | H04W 4/08 455/404.2 |
| 2013/0225118 A1* | 8/2013 | Jang | H04W 4/22 455/404.2 |
| 2013/0225152 A1* | 8/2013 | Matthews, III | H04W 8/24 455/419 |
| 2014/0142953 A1* | 5/2014 | Kim | G10L 15/22 704/275 |
| 2014/0148120 A1* | 5/2014 | Buck | H04W 4/22 455/404.2 |
| 2015/0347784 A1* | 12/2015 | Keen | G06F 19/323 726/28 |

* cited by examiner

COMMUNICATION APPARATUS, SYSTEM AND METHOD

CROSS-REFERENCE TO RELATED APPLICATIONS

This is a nonprovisional application of U.S. provisional application Ser. No. 62/032,927 filed Aug. 4, 2014, incorporated by reference herein.

FIELD OF THE INVENTION

The present invention is related to communicating an emergency signal wirelessly with location information from where the emergency signal is emanating by pushing a button or icon on a display screen that is present as a first operational screen on an apparatus. (As used herein, references to the "present invention" or "invention" relate to exemplary embodiments and not necessarily to every embodiment encompassed by the appended claims.) More specifically, the present invention is related to communicating an emergency signal wirelessly with location information from where the emergency signal is emanating by pushing a button or icon on a display screen that is present as a first operational screen on an apparatus where the emergency signal may be a silent text.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

There are other types of products currently on the market to try to help users in an emergency, but they are all designed very differently. The present invention's design is different than anything on the market today. The present invention provides the functions of instant easy 'single click' access which is critical in an emergency situation, the function of increased user customization, the function of allowing remote control access to the invention's display screen, an alert feature that provides the function of alerting the user if they need to fill out critical information pre-emergency, and the invention is designed to be able to allow the user more freedom to use the invention anywhere in the world rather than in the confines of an organization or preset geographic area.

There are currently companies that send physical equipment panic button products to a user which allow users to push a button to send out for help and typically include a monthly monitoring fee. Security companies have been doing this for years. Users can carry around a panic button device that communicates with an alarm panel or additional required receiver installed in the home or business which can then send out a panic button alert when the panic button is pushed. Once the panic button is pushed, a remote monitoring station is alerted with instructions on what the user would like to have happen next. This is typically a separate piece of equipment and charges can be up to $20.00 or more per month. The present invention's design can turn the user's existing cell phone or computer that they might already own and already be carrying, into a portable panic/emergency/location notification personal safety device, thus eliminating the need for an extra piece of equipment, and also allowing the user the freedom to send their location or emergency situation information from virtually anywhere in the world since it does not need to communicate with a nearby receiver, and uses the computer's built in GPS or location information capability. In addition, this invention's design can save the user a considerable amount of money by eliminating the need for additional hardware.

There are other alert programs available that can be loaded onto a computer but to access these programs, users need to turn on or wake up their cell phone or other type of computer, and then satisfy their security prompt, and then hunt and find the app or program in order to send out an emergency call. None of these are positioned to appear on the on or wake or lock screen or on or before or immediately after a security prompt. In an emergency situation, every second and every search and click can matter. This invention's design saves seconds, saves security prompt requirements, saves hunting and finding an emergency app lost in a sea of other apps on a home screen, or worse . . . typically not even being displayed on the home screen, and being surrounded by dozens of other apps that a user would spend even more time trying to find in a stressful emergency situation. This invention provides a 'single click' function that is designed to be positioned where a user can find it fast at the on, wake or lock screen and before or with a security prompt the instant the user turns on or wakes up their computer. The current invention currently includes an optional second click function that asks the user to confirm if they would like to initiate the text message to be sent to eliminate false alarms and help prevent what is sometimes referred to as 'butt dialing', but this is an optional extra step that has been added, yet not necessary. The present invention is uniquely designed to provide a single click emergency signal, whereas everything else on the market requires multiple clicks which is not as helpful, can cost valuable time and be life threatening in an emergency situation.

Some cell phones on the market today can include an active communication link on the lock screen that can be displayed as "Emergency Call". This product can be useful, but is very different from this invention and also has several design problems. First, most people will not push this link, even if visible pre-emergency. Some people may be afraid to push it, because they believe it will automatically call 911. This is often not always the case. If this product is present on a user's phone, and the user does push the 'emergency call' button, the user is often taken to a screen that states "you have no contacts listed". Then the user is asked to add contacts to be called from their contact list on their phone or manually added. Imagine you are actually in an emergency situation. You were not comfortable pushing the Emergency Call text button to see how it works prior to an emergency because you were afraid that it would activate an emergency call automatically. When you do push it . . . and it is an emergency . . . you are asked to enter contact numbers in order for this emergency communication link to work to contact people. What if there is someone standing there with a knife or someone has a medical emergency where every second is critical? This built in emergency call function is designed to be helpful, but is not designed as well as this invention. The present invention is downloaded allowing users to more fully understand how it works. But just as importantly, the present invention has a function which displays a warning icon to alert a user before an emergency that there are no emergency contacts listed. This warning icon is displayed anytime one of the buttons does not have any contacts listed that the user may want notified in the event of an emergency. This added feature can better prepare a user before an emergency, save seconds, and thus save lives. The way that the current emergency call feature available is designed, people are often too afraid to push the button until an emergency is actually taking place, users are not notified or often unaware that there are no contacts ready to be called, and the current call feature also creates an 'audible' call which also can put the user in a more dangerous position in some situations. An automatic audible call is not always ideal and in some situations can be horribly bad. Imagine a user is walking down the street and someone comes up with a knife. Is it really ideal for the user to push the emergency call button (probably for the first time), add contacts (if they were not already entered), and then have an audible live conversation with someone while someone is standing there with a knife? My invention is different and has built in functions to notify the user ahead of time and encourage them to enter contact information pre-emergency, and also allows the user the function of sending a silent text asking for help with exact location information, rather than creating an audible phone call.

Other products on the market include physical panic buttons that a user is supposed to run to and push in the event of an emergency. A good example of this is a college campus where they have blue light panic button towers set up. I have a daughter in college. Is it really a good idea for her to try to outrun a bad guy, try to run to the blue light, then wait at that spot since that is where security is being dispatched to, and continue to wait at that location for someone to come help while the bad guy is standing there?

Another product on the market today does try to avoid the time consuming effort of trying to satisfy the security prompt and then hunt and find an alert app on a cell phone, but the product design requires users to push the on/power button on a cell phone 4 to 5 times to initiate an emergency text message. This can be an idea resulting in disaster. What if one of those pushes completely turns the phone or computer off, and thus the user themselves prevents or stops the ability to send out the message for help.

There are other products on the market that companies are trying to sell through organizations such as college campuses, or corporations. These companies provide an app for a cell phone or computer with pre-loaded geolocations and pre-loaded instructions on who to call if the user initiates an emergency signal. Again this will not always work for the typical college student or consumer. What if a college student is attending a college that is not signed up? What if this college student will not download the product because they do not want a third party or campus security having the ability to see their location at all times? What if this college student has a medical issue, like Juvenile Diabetes or a peanut allergy and the 'preset' message is not material? What if this college student is not on campus, on spring break, traveling or has already graduated. If the student goes to a college in California and is home in Colorado, how effective are the pre-set emergency text messages? If an employee works at XYZ Corporation and is not at the facility or a teacher is located at ABC middle school, does the pre-set message on who they want dispatched to the location really work all the time? Does school security respond if the teacher or student is not at the school's location and 5 miles away at the grocery store parking lot when a robbery is taking place? Who responds then?

BRIEF SUMMARY OF THE INVENTION

The present invention creates multiple panic, emergency or location notification buttons on the wake up display screen of a computer that are designed to provide, when touched, the function of automatically sending out a text message to one or more phone numbers as well as the function of providing GPS coordinates and a location link that will show a map of the exact location of the person pushing the button. This new invention's design provides a single click function on the computer's wake or on button display screen so that users can access this function with a single click in the event of an emergency and will be able to access this invention quickly if needed.

The present invention is related to a communication apparatus. The apparatus comprises a computer. The apparatus comprises a transmitter for transmitting wireless signals in communication with the computer. The apparatus comprises a receiver for receiving wireless signals in communication with the computer. The apparatus comprises a memory in communication with the computer. The apparatus comprises a global positioning system (GPS) or location determining capability system for determining the apparatus' location. The apparatus comprises a display in communication with the computer. The apparatus comprises a first operational screen that appears on the display. The first operational screen is a first screen through which the computer can be activated and performed by the computer after the apparatus is turned on or woken up or before or with a lock screen or before or with a security prompt. The first operational screen having an emergency icon which when selected causes the computer to send with the transmitter a text stored in the memory to at least one remote contact stored in the memory along with location information from the GPS or location determining capability system where the apparatus is currently located.

The present invention pertains to a method for communicating. The method comprises the steps of displaying a first operational screen on a display of an apparatus after the apparatus is turned on or woken up. The first operational screen is a first screen through which the apparatus can be activated and performed by the computer after the apparatus is turned on or woken up or before or with a lock screen or before or with a security prompt. There is the step of selecting an emergency icon on the first operational screen which causes the computer to send with a transmitter of the apparatus a text stored in the memory to at least one remote contact stored in the memory along with location information from a GPS or location determining capability system where the apparatus is currently located.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
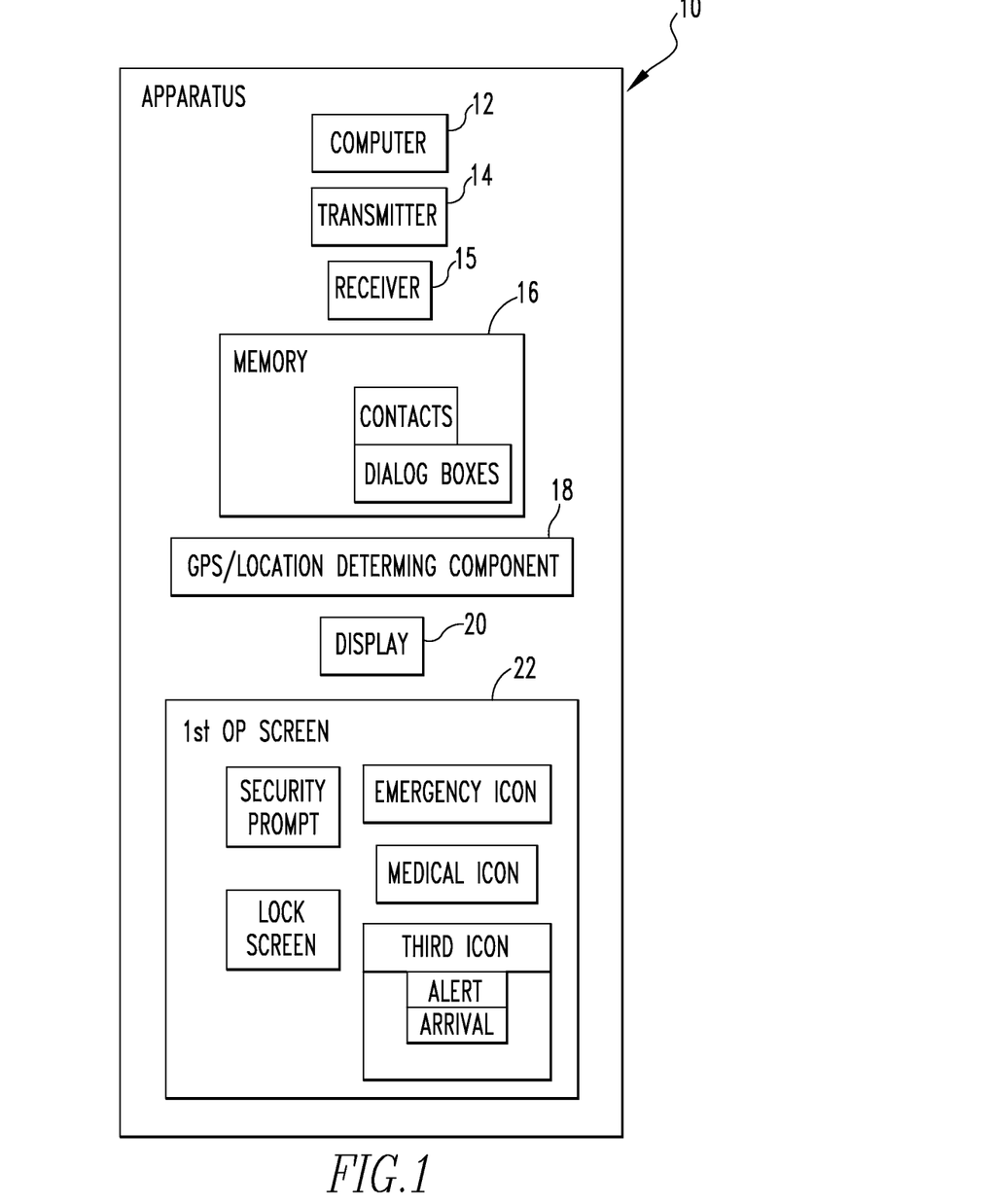
FIG. 1 is a block diagram regarding the apparatus of the present invention

Referring now to the drawings wherein like reference numerals refer to similar or identical parts throughout the several views, and more specifically to FIG. 1 thereof, there is shown a communication apparatus 10. The apparatus 10 comprises a computer 12. The apparatus 10 comprises a transmitter 14 for transmitting wireless signals in communication with the computer 12. The apparatus 10 comprises a receiver 15 for receiving wireless signals in communication with the computer 12. The apparatus 10 comprises a memory 16 in communication with the computer 12. The apparatus 10 comprises a global positioning system (GPS) 18 for determining the apparatus 10' location. The apparatus 10 comprises a display 20 in communication with the computer 12. The apparatus 10 comprises a first operational screen 22 that appears on the display 20. The first operational screen 22 is a first screen through which the computer 12 can be activated and performed by the computer 12 after the apparatus 10 is turned on or woken up or before or with a lock screen or before or with a security prompt. The first operational screen 22 having an emergency icon or button which when selected causes the computer 12 to send with the transmitter 14 a text stored in the memory 16 to at least one remote contact stored in the memory 16 along with location information from the GPS or location determining component 18. where the apparatus 10 is currently located. In one embodiment, the first operational screen 22 can be on the lock screen so when the lock screen is unlocked; the emergency can be activated (pushed or touched or depressed or swiped for instance) from the unlocked lock screen. In another embodiment, the first operational screen 22 can be on the lock screen and the emergency icon or button can be activated even though the apparatus 10 is still locked for all other functionality and the unlock function on the lock screen has not been activated. In another embodiment, the first operational screen 22 can appear immediately as the first operational screen 22 after the locked screen is unlocked, where the lock screen immediately disappears after the lock screen is unlocked, and the first screen that immediately appears is the home screen; then the home screen is the first operational screen 22 with the functionality of the present invention described herein. In another embodiment, the first operational screen 22 can appear on the display 20 as the first screen after the apparatus 10 is turned on or wakes up and before the lock screen, and the functionality can be activated even before the apparatus 10 is unlocked, for instance at the lock screen. In another embodiment, the first operational screen 22 will be the next display to appear on the display 20 as the first screen to appear after the apparatus 10 has gone to sleep. The apparatus 10 may be a cell phone, tablet, IPad, laptop or any other portable device able to be easily carried by a user and have the ability to communicate wirelessly to a remote location, such as a server, or other cell phone or receiving station that can receive the text and location information.

The text may be a silent text. The computer 12 may send the text to multiple contacts at once stored in the memory 16 along with the location information. The operational screen may include a medical icon which, when selected, causes the computer 12 to send a medical text with medical information stored in the memory 16 to at least one medical contact stored in the memory 16 along with the location information. The operational screen may include a third icon which, when selected, causes the computer 12 to send a customized text of customized information stored in the memory 16 to at least one remote customized contact stored in the memory 16 with the location information. The apparatus 10 may include a receiver 15 for receiving wireless signals in communication with the computer 12.

Ideally, the screen with the emergency icon becomes the first display seen but also only after a computer has been asleep. When the computer's timer allows the computer to go to sleep, the screen with the emergency icon currently is then set to become the first screen on the display after the computer wakes up and is tapped or manually woken up after asleep.

It is not necessarily desired to have the screen with the emergency icon always have to display every time the computer is woken up because that can end up being terribly annoying. Many phones have settings that when asleep will be woken up by several events, such as someone tapping the phone, an incoming call, an incoming text, an alarm setting, etc. Preferably, the screen with the emergency icon is only displayed after a phone is asleep and when tapped to wake up or manually woken up after asleep, and not also pop up when someone gets an incoming call for example, or an incoming text or an alarm goes off.

For example, let's say a phone is awake. An incoming call occurs which also creates another 'wake' signal to the phone. The phone is already awake and might already be in use. Then the screen with the emergency icon pops up on the display before the phone can be answered, since the phone is set to display the screen with the emergency as the first screen when a computer is woken up. That becomes more annoying than helpful. The person has to get rid of the screen with the emergency icon to answer the phone. Same with an incoming text or alarm for example. Or when trying to push the dial pad to enter a password. This would create an unnecessary number of displays that the user may not like. Thus, it is preferable for the screen with the emergency icon current design to appear on the display when a computer is woken up but only after it has been asleep.

The present invention pertains to a method for communicating. The method comprises the steps of displaying a first operational screen 22 on a display 20 of an apparatus 10 after the apparatus 10 is turned on or woken up. The first operational screen 22 is a first screen of the apparatus 10 activated and performed by the computer 12 after the apparatus 10 is turned on or woken up or before or with a lock screen or before or with a security prompt. There is the step of selecting an emergency icon on the first operational screen 22 which causes the computer 12 to send with a transmitter 14 of the apparatus 10 a text stored in the memory 16 to at least one remote contact stored in the memory 16 along with location information from a GPS or location determining system 18 where the apparatus 10 is currently located.

This invention is designed to try to allow users to access the invention before or with a security prompt or lock screen display 20, and before a computer 12 home screen. If a computer 12, such as an iOS phone or manufacturer tries to prevent the app from positioning on the lock screen, the user would be able to find the app on the phone, open it, and then be able and ready to send an emergency text and their location information with 'a single click' when they wake up their device. For example if someone were walking to their car late at night, they would be able to use the 'single click' function that this invention provides.

The present invention's design provides a function which allows the user more freedom to change, edit and update their own contact list and their own custom message, and does not rely on a pre-set back-end dispatch configured by a third party organization.

The present invention's design is unique from all the above attempts at designing a product that can send out for help or alert others about their location. This invention's design provides functions which do not rely on a separate piece of equipment like physical panic buttons or blue light tower buttons. This invention is more cost effective because it turns a computer 12 or mobile device that users already have into a product that can help save their lives or alert people of their location with a single easy to find 'single click' button.

This invention's design is unique because it provides the function of allowing a user to send out a silent text to people rather than an audible call which many cell phones already have built in, and provides the function of allowing a user to create custom messages without relying on a third party providing the response service or response protocol.

This invention's design is unique because it does not rely on a facility or organization to have preset emergency alert messages, or have the user be in a specific area or even affiliated with an organization to be effective or to work.

This invention's design provides functions that allow the user to be free to provide and create their own contacts they want to send their location information to, free to customize their own messages, free to send their location information at any time, free to send silent messages, free to be protected anywhere in the world and to access this ability using an easy to find single click button positioned at the on, wake or lock display 20 screen, thus saving seconds that could save their life.

How contacts and customization text associated for a given button is entered:

There are 2 ways that users can customize their contact list or customize their text messages that can be automatically sent when they select or push the invention's buttons. The first way allows users to customize their equipment recovery information, contact information and create custom text messages on the computer 12 itself The second way possible is to allow users to use a remote server 24 that can communicate with the computer 12 apparatus 10 installed to customize their recovery, contact information and custom messages from remote.

Figure 2:
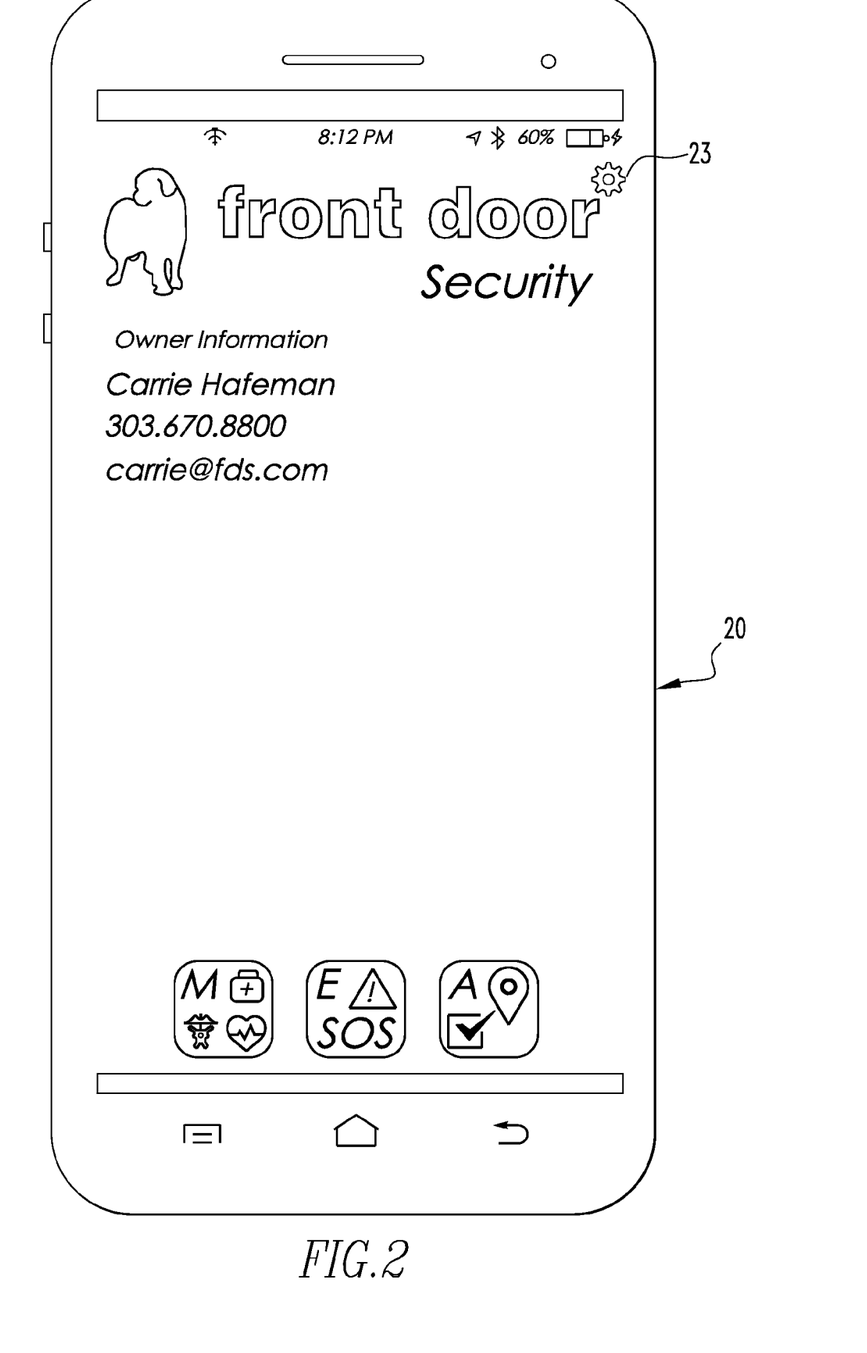
FIG. 2 shows the apparatus display.

For the current design, and for the steps to customize the information on the computer 12 itself, the user would find an information icon 32, such as a black gear box icon on the top right hand corner above the Front Door Security heading. To use this function in the apparatus 10 they would first press the gear button icon. FIG. 2 shows the apparatus 10 display 20.

When they select the gear box icon on the top right, a series of dialog boxes appear allowing the user to edit, change and update their information.

Figure 3:
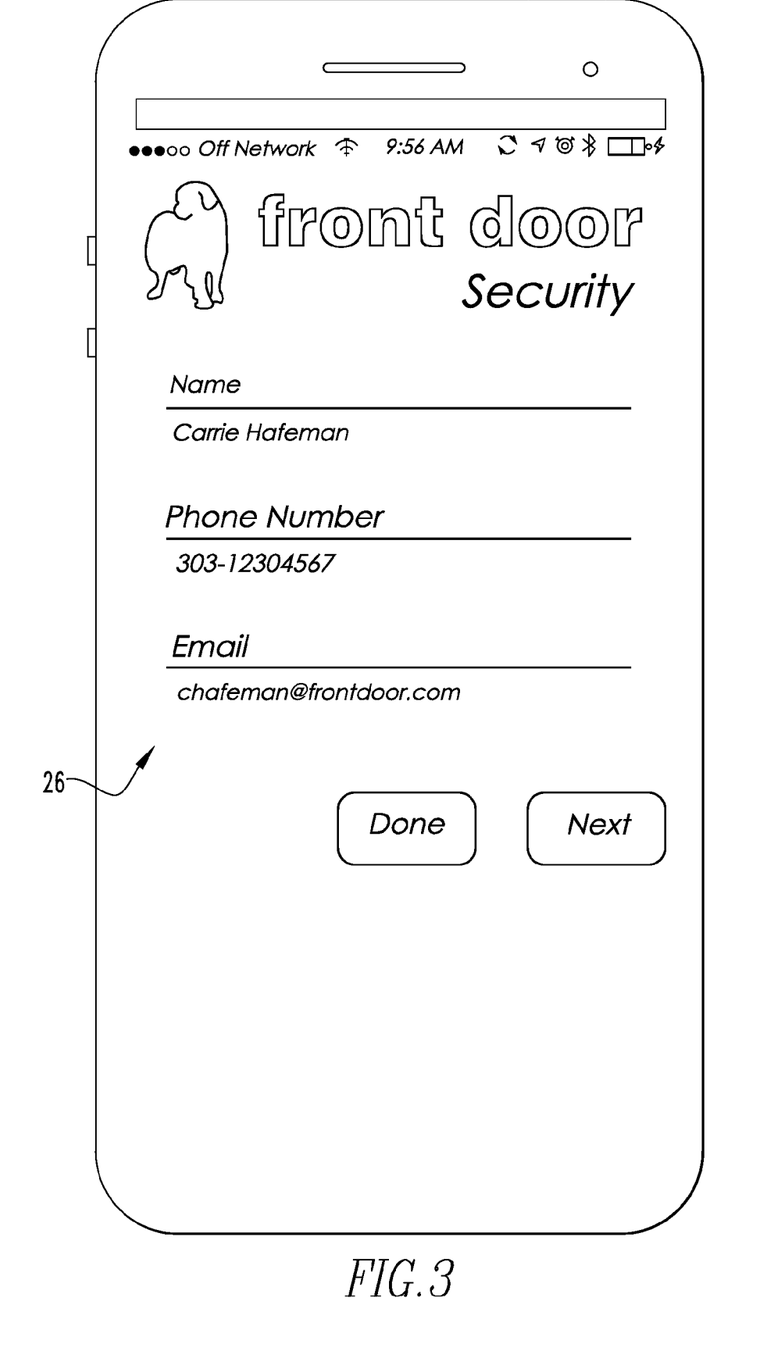
FIG. 3 shows an example of the first dialog box.
Figure 4:
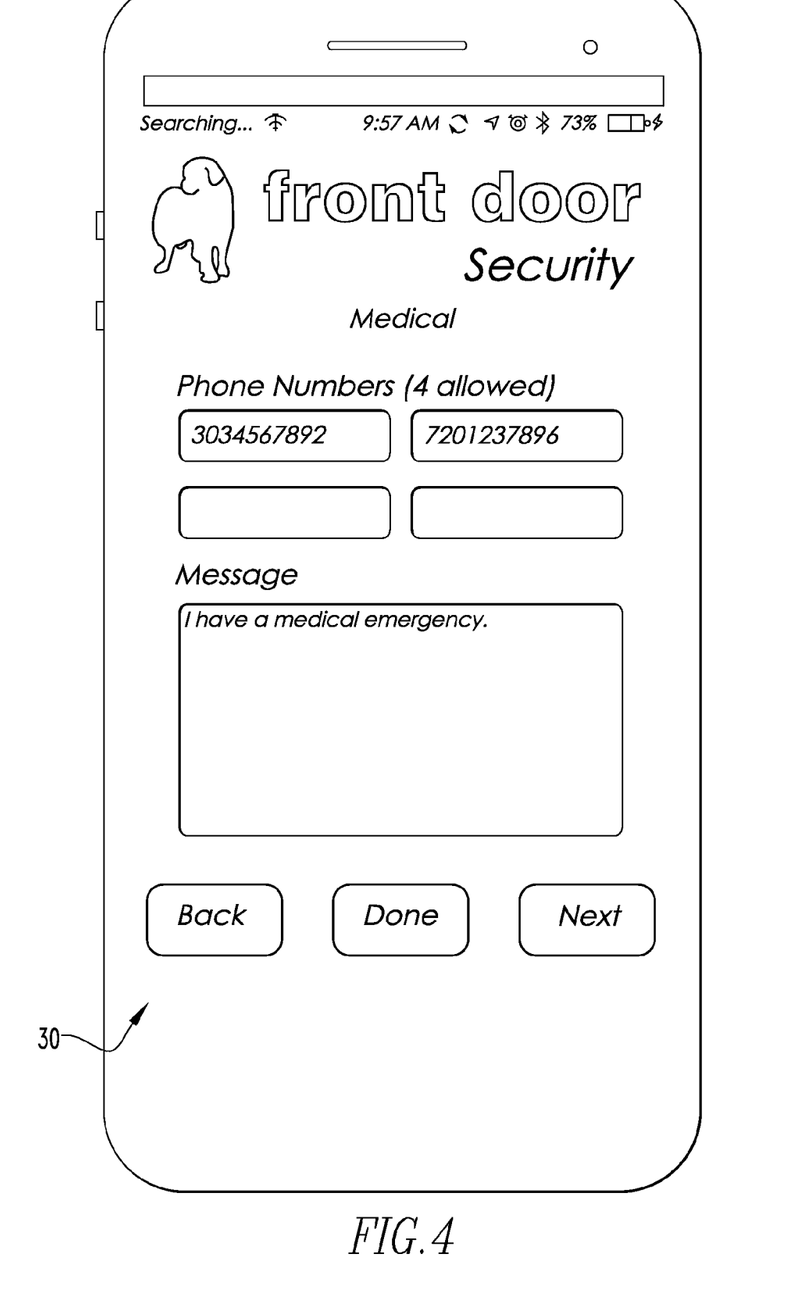
FIG. 4 shows a Medical dialog box that is associated with the 'M' button.
Figure 5:
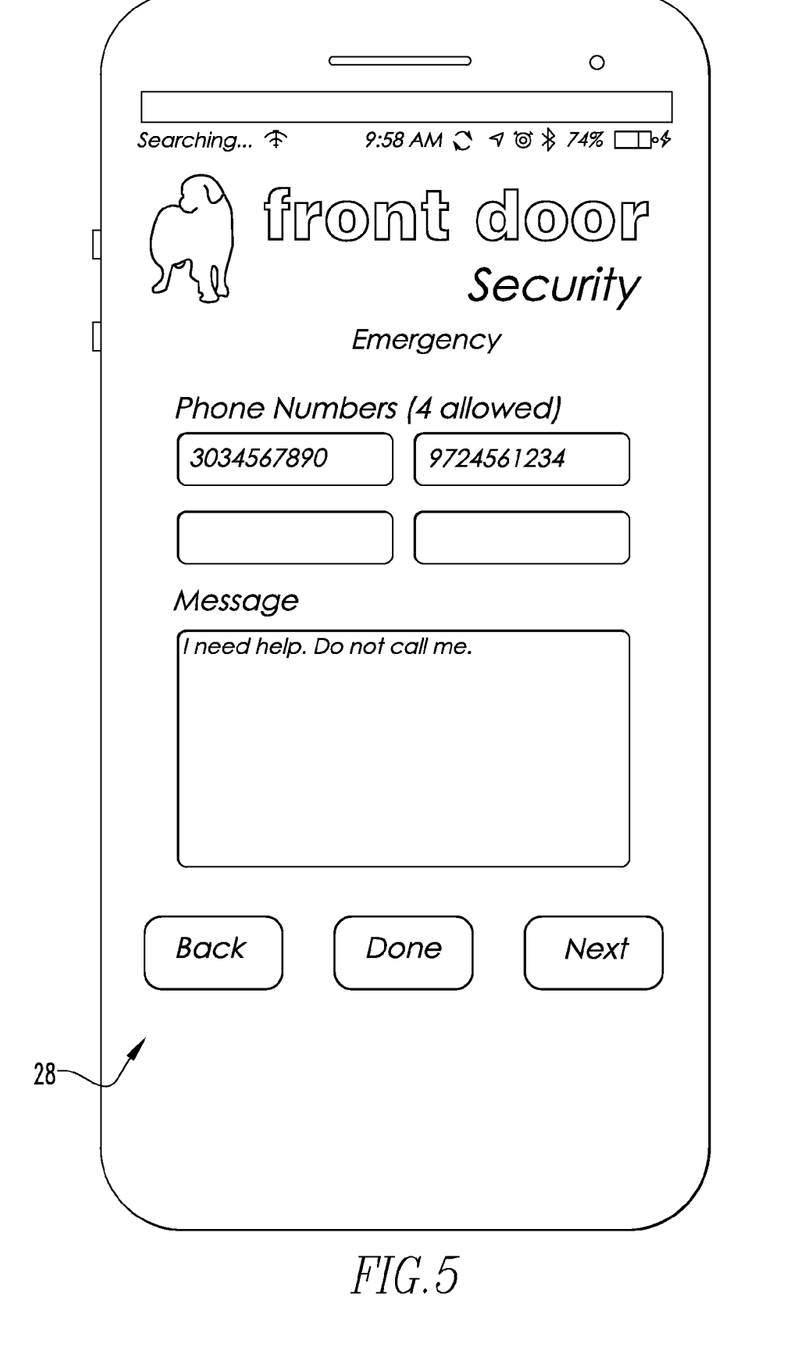
FIG. 5 shows the 'E' button dialog box.

The first dialog box 26, as shown in FIG. 3, allows the user to enter, edit or update their equipment recovery information which can include one or more of the following: name, phone number or email. They can edit, change or update whatever they chose to, and then select the 'Done' or the 'Next' button. If they select 'Done' the new information is stored in the memory 16 of the computer 12, and the display 20 returns to the original apparatus 10 default display 20 shown in FIG. 2. FIG. 3 shows an example of the first dialog box 26 that currently displays when the user pushes the information icon or more specifically, gear icon on the top right corner:

If the user selects the 'Next' button the next dialog box, as shown in FIG. 4 will allow them to enter the contact information that they would want to be notified in a Medical emergency along with a custom message that they would like to send. The user can use this Medical dialog box 30 to enter up to four numbers that will send an automatic text to if the user pushes the 'M' button on the apparatus 10 display 20 screen. When this dialog box appears the user can choose to enter, edit or update information and then select three buttons at the bottom of the 'M' dialog box when finished editing, changing or updating the Medical contact and message information which are 'Back', 'Done', or 'Next'. If the user selects 'Back', the user is taken back to the previous dialog box which is currently the equipment recovery dialog box. If the user selects 'Done', the user updates their Medical contact and custom message information associated with the 'M' button which will allow this information to be stored in the memory 16 of the computer 12, and the user will return to the default apparatus 10 display 20. FIG. 4 shows an example of the current Medical dialog box 30 that is associated with the 'M' button. This information is stored by the apparatus 10 in the memory 16 of the computer 12, so if the user pushes the 'M" button these are the contact phone numbers the apparatus 10 will use to provide the function of sending outgoing text message(s) and any custom message provided as well as location information when the user pushes the 'M' button:

If the user selects the 'Next' button they will be taken to the next dialog box, shown in FIG. 5, which is currently the Emergency dialog box 28 where they can add, edit or update the contacts they would like to have contacted in the event they push the 'E' button on the apparatus 10 default display 20. After editing or changing the information using this dialog box, the user can then select the 'Back', 'Done' or 'Next' button. After entering or changing information, this information will be updated to the memory 16 stored in the computer 12, so that if the user selects the 'E' button that will provide the function of sending the contacts entered an emergency text with an emergency custom message and location information generated by the computer 12. FIG. 5 shows an example of the 'E' button dialog box.

Figure 6:
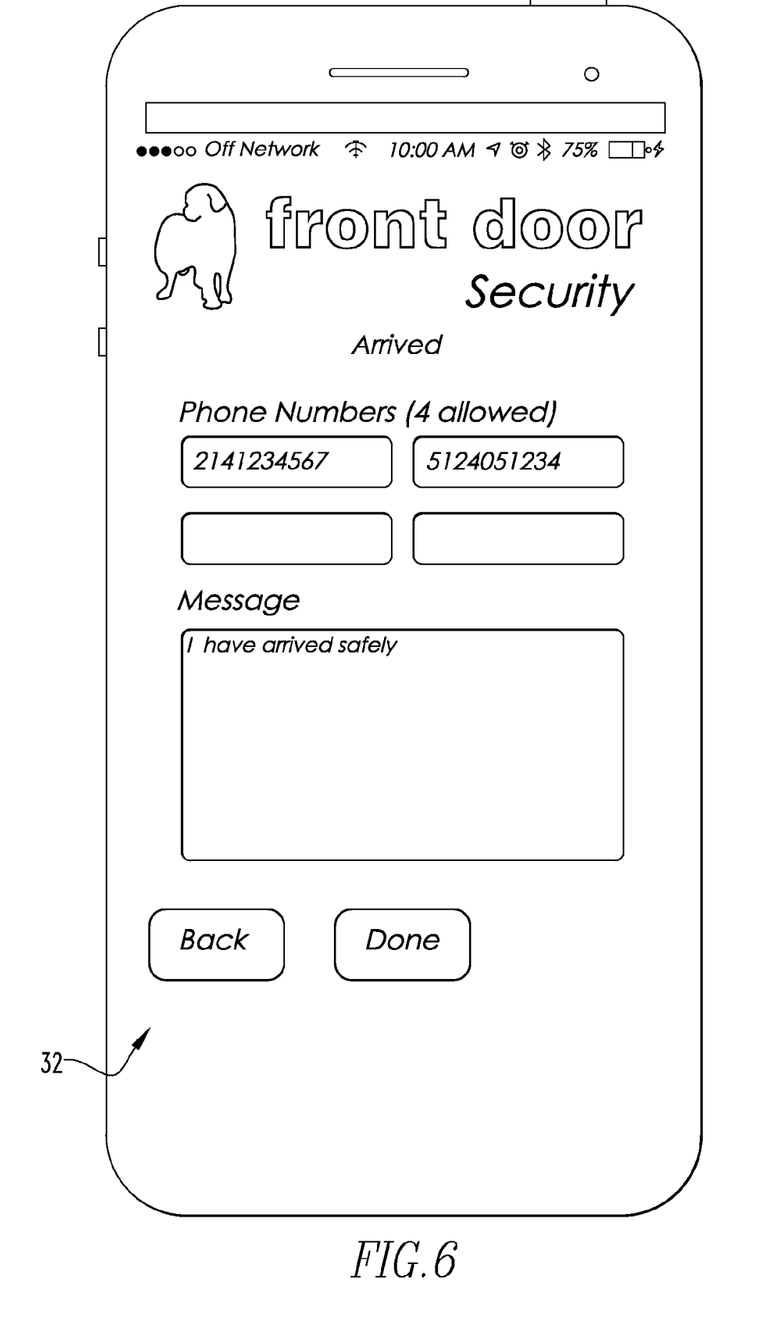
FIG. 6 shows a screen shot of the dialog box associated with the 'A' button.

Currently, the 'Back' button will take the user back to the Medical dialog input box, the 'Done' button will update any information to the data stored in the memory 16 of the computer 12 and also take the user to the default apparatus 10 display 20 and the 'Next' button will take the user to the 'Arrived' or custom dialog box 32 associated with the 'A' button, shown in FIG. 6.

When the user arrives at the 'A' button dialog box 32, the user can enter up to 4 numbers and a custom message that will be sent when the user selects the 'A' button on the default apparatus 10 display 20 screen. They can enter, edit or update information and then they can select the 'Back' or 'Done' button. The 'Back' button will currently take them back to the Emergency input dialog box. Selecting the 'Done' button will update any new information and send this information to the data stored in the memory 16 of the computer 12 that the apparatus 10 will access if the user pushes the 'A' button and also take the user back to the default apparatus 10 display 20 screen. The 'A' button is fully customizable. For example, the A button can be customized to be an 'Alert' button at a school. For example, the student or person sending the distress signal is not directly in danger. Perhaps someone sees an accident or something disturbing and simply wants to silently alert someone of something going on. The A button can also stand for 'Arrived'. In this situation a teenager could push the A button which would provide the function of quickly texting their parents or friends that they have 'Arrived' at a location. This would make it super easy for someone to quickly let people know that they have arrived with a single click of a button, and would also be helpful for parents to confirm 'when' their child had arrived as well as confirm 'where' their child has actually arrived.

FIG. 6 shows an example of a screen shot of the dialog box 32 associated with the 'A' button:

The screen shots above currently appear when users select and use the gear icon to add, edit or update their information that appears or is associated with the apparatus 10 MEA buttons. When the user updates their information associated with the buttons or icons on the apparatus 10 screen, this information is stored in the memory 16 of the computer 12, so that if the user selects any of the buttons, the apparatus 10 performs the function of using the pre-set instructions to notify the contacts associated with the specific button, with the user specified custom message and with location information also included if the computer 12 is able to access the GPS or location determining capability system 18 included with the computer 12 to send a link to display 20 a map of the exact location as well.

The apparatus 10 also provides for the ability to communicate with a remote server 24. Thus by changing equipment recovery information, or contact phone numbers and custom messages using the gear icon in the user's computer 12, this information is not only updated in the memory 16 of the computer 12, but is also updated on a remote server 24 associated with the user's account that the user created when downloading the product.

The remote server 24 provides a second way that users can customize their equipment recovery information, contact list or custom text message. The invention could be a stand-alone invention and not require a remote server 24, but adding remote server 24 capability can be useful. The remote server 24 is added because it can be helpful and provide an additional revenue model for the product by allowing additional useful content to also be delivered to the display 20 screen such as apps, ads, offers, logos or information. The remote server 24 can also be helpful in changing and updating owner recovery information from remote if a computer goes missing.

View of the server and the server's operation.

The invention provides a function of allowing communication to a remote server which allows users to update their equipment recovery information, and update their contacts and custom messages that they would like to be affiliated with the MEA buttons currently on the apparatus 10 display 20 screen from remote. Being able to change equipment recovery information from remote is very helpful. For example, if someone is traveling, they can remotely update the equipment recovery phone number to a hotel number or the cell phone number of a friend that they may be traveling with. The invention currently also displays and provides functions for three MEA panic/emergency location communication buttons, but there is no limit to the number of buttons the invention can add.

Currently, if the user would like to edit the contact numbers or messages associated with the apparatus 10 MEA buttons using the remote server 24, the user would go on-line to access the remote server 24. The user would type in the server's Internet address. The user would arrive at the server's website. Ideally, the user would log-in to the server using a user name and password. If the user name and password were correct, the user would be allowed access to their account hosted by the server. The user could then change the contact numbers and custom message that would be associated with the MEA buttons that appear on the apparatus 10 display 20 screen. When the user updates the MEA button information on the server, this information will be remotely downloaded to the data stored in the memory 16 of the user's computer 12, so that after the update, if the user selects the M or E or A button, the new contacts or new message will be sent according to the new information.

Here is a picture draft of what a user could see in their account using the remote server 24 to edit, change or update information in their account.

Server Screen Sample in Customer Account

Please fill in up to 4 contacts that you would like to send a text to in the event of a Medical Emergency. If in an emergency you should first call 911 if possible. In the event you would also like to quickly notify others please push the M button. Your cell phone will try to send a text message with a note to the phone numbers you have listed in addition to a map showing your location if your GPS is enabled. You can also edit the message below. Make sure that the contact numbers you list are cell phone numbers that can receive a text.

|  |  | Message | Contact 1 | Contact 2 | Contact 3 | Contact 4 |
|---|---|---|---|---|---|---|
| EDIT UPDATE |  | I am in trouble. I have xyz (for example JDRF) medical condition. Please send help to my location. My phone number is xxx-xxx-xxxx | xxx-xxx-xxxx |  |  |  |

Please fill in up to 4 contacts that you would like to send a text to in the event of an emergency. If in an emergency you should first call 911 if possible. In the event a silent text seems safer than making a phone call, or after a 911 call, push the E button. A text will instantly be sent with a note to all the phone numbers you have listed in addition to a link that will display a map of your location if your GPS is enabled. You can also edit the message below. Make sure that the contact numbers you list are cell phone numbers that can receive a text.

|  |  | Message | Contact 1 | Contact 2 | Contact 3 | Contact 4 |
|---|---|---|---|---|---|---|
| EDIT UPDATE | ■ | I am in trouble and sending a silent text. Please do NOT call me back, but send help to this location. | xxx-xxx-xxxx |  |  |  |

This is a custom button. You can use it to text people to say you have arrived in a split second. You can customize it to also alert people to a situation. Please fill in up to 4 contacts. A text will be sent with a note to the phone numbers you have listed in addition to a link to display a map of your location if your GPS is enabled. You can also edit your message. Make sure that the contact numbers you list are cell phone numbers that can receive a text message.

| | Message | Contact 1 | Contact 2 | Contact 3 | Contact 4 |
|---|---|---|---|---|---|
| EDIT UPDATE | A | I have arrived | xxx-xxx-xxxx | | |

Mobile Licenses and Display Page (Admin Only)

On the remote server 24 that the invention can communicate with, there will be another page to allow authorized parties to include a function that can allow ads, logos, pictures or app links to be communicated to the invention to appear on the invention display 20 screen. This will provide a function that will allow the invention to provide more than one revenue model for the invention, for example: 1) licensing, 2) an ad supported revenue model, or 3) a combination of both.

| CID | License | EndDate | APP picture | APP address | Ad Picture | AD website |
|---|---|---|---|---|---|---|

Figure 7:
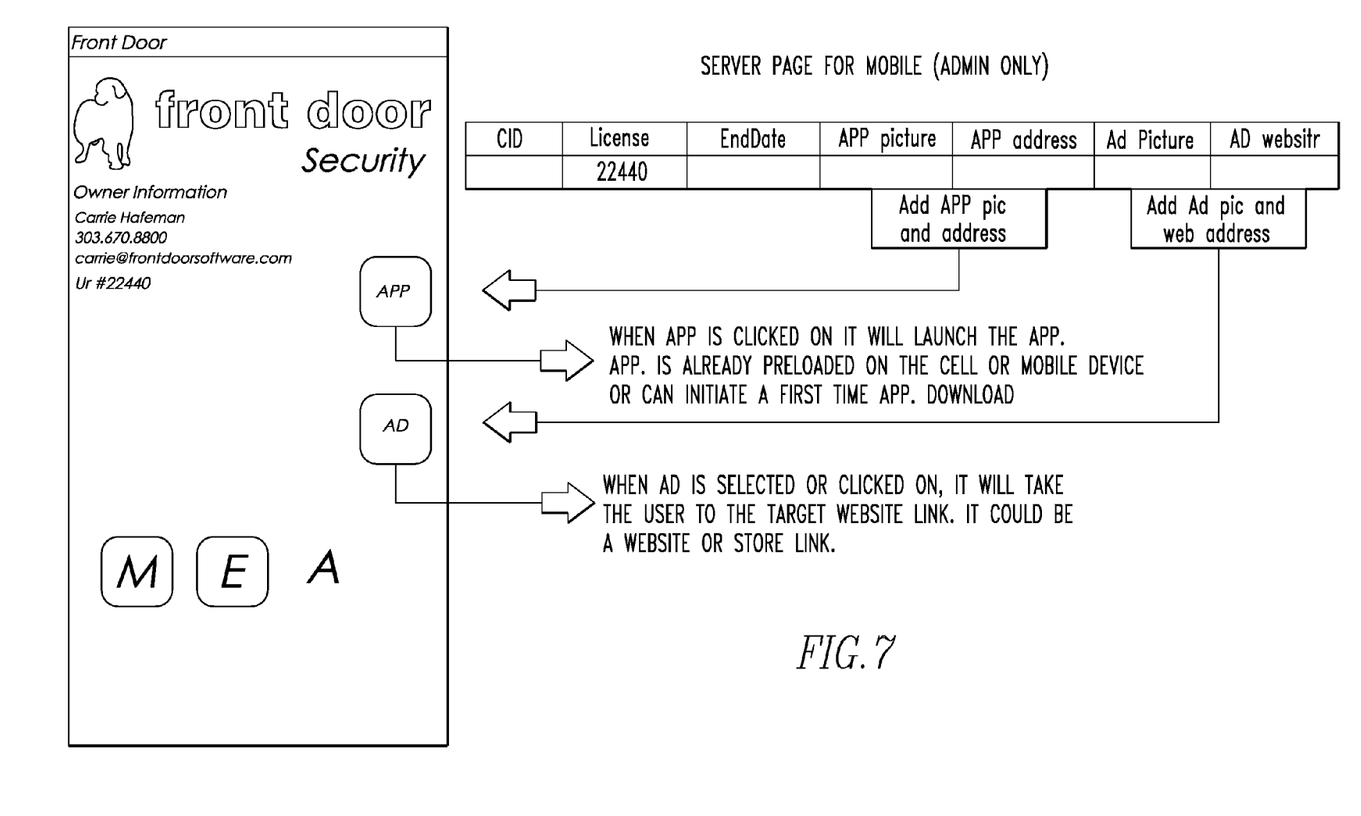
FIG. 7 shows the remote server page.

The remote server 24 will be able to not only provide the function of allowing the user to change and customize their recovery screen to help them with recovering lost or stolen equipment, allow them to try to send out an alert to be rescued if in danger, but authorized parties or the party providing the invention to the user, will also be able to have the ability to control the display 20 and deliver ads, apps, logos, information, pictures or designs to the screen from remote. An authorized party can add an advertisement picture, or app picture with instructions on what will happen if the user pushes or selects the ad or app on the invention's display 20 screen. The invention provides a function that allows these additional types of communications from the remote server 24, stores the information in the memory 16 of the computer 12, and displays the information on the invention's display 20. An authorized party can update information on the remote server 24 at any time, and this new updated information will be communicated to the invention which will update the information stored in the memory 16 of the computer 12, and will replace the previous information and display the new information on the invention's display 20. FIG. 7 shows the remote server 24 page.

This system can help people protect and recover their equipment, help save people's lives, and also provide functions to provide helpful content or information on the display 20 screen, which can help reduce the cost for the user by providing the function of allowing the ability to generate revenue from app companies, web content providers, and/or other information or product providers.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A communication apparatus comprising: a computer; a transmitter for transmitting wireless signals in communication with the computer; a memory in communication with the computer; a global positioning system (GPS) or location tracking system for determining the apparatus' location; a display in communication with the computer; and a first operational screen that appears on the display as a first screen after the apparatus is turned on or only after the computer is asleep and not when the computer receives an incoming call or an incoming text or an alarm goes off in the apparatus, the first operational screen is the first screen through which the computer can be activated and performed by the computer after the apparatus is turned on or only after the computer is asleep and not when the computer receives an incoming call or an incoming text or an alarm goes off in the apparatus, the first operational screen having an emergency icon which when selected causes the computer to send with the transmitter a text stored in the memory to at least one remote contact stored in the memory along with location information from the GPS where the apparatus is currently located, the text indicates that the user is in trouble and that help should be sent to the location, the operational screen appearing before a home screen that has many often used icons and apps, the home screen appears after the first operational screen, the home screen is a primary screen on the display during normal operation of the computer and the computer is awake, the first operational screen separate and distinct from a lock screen.

2. The apparatus of claim 1 wherein the computer sends the text to multiple contacts at once stored in the memory along with the location information.

3. The apparatus of claim 2 wherein the operational screen includes a medical icon which, when selected, causes the computer to send a medical text with medical information stored in the memory to at least one medical contact stored in the memory along with the location information.

4. The apparatus of claim 3 wherein the operational screen includes a third icon which, when selected, causes the computer to send a customized text of customized information stored in the memory to at least one remote customized contact stored in the memory with the location information.

5. The apparatus of claim 4 wherein the third icon is an alert icon, which when activated, causes the computer to send a text that alerts the one remote customized contact of an alert.

6. The apparatus of claim 5 wherein the alert icon is an arrival icon which, when activated, causes the computer to send a text indicating the user has arrived at a destination to the one remote customized contact saved in the memory with the location information.

7. The apparatus of claim 6 wherein the memory has an emergency dialog box in which a text that is to be transmitted when the emergency icon is activated is entered and a phone number to which the text is to be sent is entered.

8. The apparatus of claim 7 wherein the memory has a medical dialog box in which a text that is to be transmitted when the medical icon is activated is entered and a phone number to which the text in the medical dialog box is to be sent is entered.

9. The apparatus of claim 8 wherein the memory has an alert dialog box in which a text that is to be transmitted when the alert icon is activated is entered and a phone number to which the text in the alert dialog box is to be sent is entered.

10. A method for communicating comprising the steps of: displaying a first operational screen on a display of an apparatus after the apparatus is turned on or only after the computer is asleep and not when the computer receives an incoming call or an incoming text or an alarm goes off in the apparatus, the first operational screen is a first screen of the apparatus can be activated and performed by the computer after the apparatus is turned on or woken up, the operational screen appearing before a home screen that has many often used icons and apps, the home screen appears after the first operational screen, the home screen is a primary screen on the display during normal operation of the computer and the computer is awake, the first operational screen separate and distinct from a lock screen; and selecting an emergency icon on the first operational screen which causes the computer to send with a transmitter of the apparatus a text stored in the memory to at least one remote contact stored in the memory along with location information from a GPS or location tracking system where the apparatus is currently located, the text indicates that the user is in trouble and that help should be sent to the location.

11. The method of claim 10 including the step of activating an information icon on the display so a series of dialog boxes appear on the display.

12. The method of claim 11 including the step of updating on a remote server information in at least one of the dialog boxes.

\* \* \* \* \*